United States Patent

Correns et al.

Patent Number: 6,141,884
Date of Patent: Nov. 7, 2000

[54] INSTRUMENT FOR MEASURING COORDINATES

[75] Inventors: Nico Correns, Weimar; Klaus Spring, Hermstedt, both of Germany

[73] Assignee: Carl Zeiss Jena GmbH, Jena, Germany

[21] Appl. No.: 09/269,663

[22] PCT Filed: Oct. 1, 1997

[86] PCT No.: PCT/EP97/05410

§ 371 Date: Mar. 30, 1998

§ 102(e) Date: Mar. 30, 1998

[87] PCT Pub. No.: WO98/16797

PCT Pub. Date: Apr. 23, 1998

[30] Foreign Application Priority Data

Oct. 14, 1996 [DE] Germany ............... 196 42 293

[51] Int. Cl.$^7$ .................................. G01B 5/008
[52] U.S. Cl. ............................... 33/503; 356/375
[58] Field of Search ................. 33/503; 356/375, 356/376

[56] References Cited

U.S. PATENT DOCUMENTS

| | | | |
|---|---|---|---|
| 4,113,389 | 9/1978 | Kaye | 356/373 |
| 5,636,023 | 6/1997 | Yanagisawa | 356/376 |
| 5,825,666 | 10/1998 | Freifeld | 33/503 |
| 5,969,820 | 10/1999 | Yoshii et al. | 356/375 |
| 6,055,056 | 4/2000 | Kuehmstedt et al. | 356/376 |

FOREIGN PATENT DOCUMENTS 26 23 651 5/1976 Germany.
38 22 275 7/1988 Germany.

Primary Examiner—G. Bradley Bennett
Attorney, Agent, or Firm—Reed Smith Shaw & McClay LLP

[57] ABSTRACT

A coordinate measurement device with an optical sensing system for non-contact sensing of structures and edges of measurement objects 4 comprises a CCD camera with an objective and CCD matrix on which the measurement object is imaged, wherein the distance between the objective and the plane of the matrix is adjustable for the purpose of adjusting the magnification. For purposes of adjusting magnification, an actuating element is provided at the sensing system, which actuating element can be connected with a driving element arranged at the coordinate measurement device. The magnification adjusting movement is carried out by the drive of the coordinate measurement device responsible for the assigned coordinates. Further, a circuit arrangement is provided for mixing electronically generated crossline signals with the signals of the CCD matrix. A logic circuit is provided for linking the CCD elements representing the vertical and horizontal lines. The sensing system signals are transmitted with or without wires via a video transmitter to a video receiver of an evaluating and displaying unit.

8 Claims, 2 Drawing Sheets

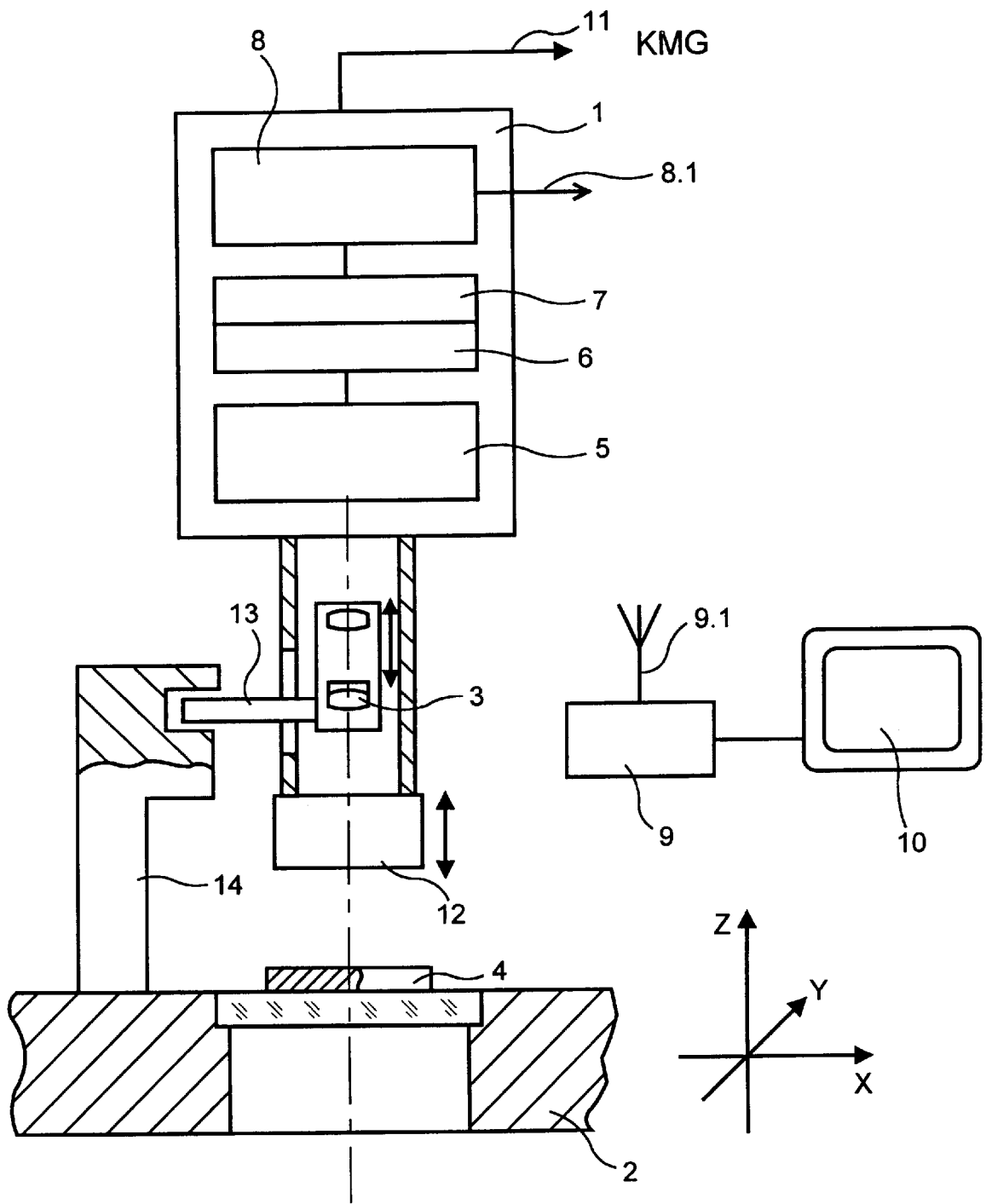
F I G. 1

INSTRUMENT FOR MEASURING COORDINATES

BACKGROUND OF THE INVENTION a) Field of the Invention

The invention is directed to a coordinate measurement device with an optical sensing system for non-contact sensing of edges and surface structures of measurement objects. The field of application is optical coordinate measurement technology, especially the measurements of measurement objects by means of single- or multiple-coordinate measurement devices.

b) Description of the Related Art

In an optical probe in coordinate measurement devices described in U.S. Pat. No. 5,319,442 for determining the position of surface structures in test pieces and measurement objects in relation to the moving part of the coordinate measurement device, a sensor array is provided and the structures of the measurement object are imaged thereon by means of imaging optics comprising a plurality of components. By means of sequential scanning of the individual sensors of the array, the image of the measurement object is analyzed on the sensor arrangement. As soon as the structure has reached a predetermined sensor of the sensor arrangement, a trigger signal is generated and sent to a control system of the coordinate measurement device for determining the position of the movable arm relative to the structure. A disadvantage in this device consists in the high technical complexity in evaluating the signals for obtaining measurements DE 40 18 333 A1 describes a process and a device for the automatic detection of edges of hardness measurement indentations, wherein the hardness measurement indentation is detected by a TV camera and the obtained video signal is supplied to a comparator which has an adjustable level. The output signal of the comparator is differentiated and the contour signals thus obtained are loaded into memory. The geometric data of the measurement indentations are computed from these contour signals.

It can be seen from Publication No. 8942.5m, Part. No. H1000-315201-A by Renishaw, "VP 2 Video Scanning System", 1994, and the accompanying data sheet for a VP 2 Video scanner for coordinate measurement devices that these scanners have imaging optics with fixed focal length in which different magnifications can be achieved in that the focal plane of the objective is located at a variable distance from the objective depending on the desired magnification. The focusing required in this case is carried out by means of an axial movement (usually in the Z-axis) of the coordinate measurement device.

In order to mark or scan positions on the image of the measurement object imaged on the screen, a cross-hair or cross-line is faded in on the screen and can be moved into a wide variety of positions on the screen in two coordinates X and Y via rotary switches and tuning elements (publication of HIMMELREICH-elektronik GmbH & Co. KG, Schwaigern, Germany, "Fade-in Video Cross-hairs" data sheet).

This cross-line which is composed of two lines is generated by a reticle generator or cross-line generator, as it is called, wherein a crystal-controlled time base is provided and there is accordingly no exact relationship to the pixels.

OBJECT AND SUMMARY OF THE INVENTION

It is the primary object of the invention to provide an optical sensing system for coordinate measurement devices which has a compact and technically simple construction and can be handled with ease.

According to the invention, this object is met in a coordinate measurement device with an optical sensing system for non-contact sensing of edges and structures of measurement objects by means of the features shown in the first claim, wherein the sensing system is displaceable in at least one coordinate as a component of the coordinate measurement system. Advantageous developments and embodiment forms of the invention are described below.

The sensing system comprises a CCD camera with an objective lens and a CCD matrix in the focal plane thereof, wherein the distance between the objective and the focal plane is varied in order to adjust magnification.

For this purpose, a trunnion is arranged at the housing of the objective and is brought into a working connection with a trunnion receptacle arranged at the coordinate measurement device or at a carriage or slide of the coordinate measurement device. In order to focus sharply on the object, the entire sensing system is moved in a direction vertical to the object plane by the drive of the coordinate measurement device. The displacement of the sensing system relative to the object is likewise carried out by the drive of the coordinate measurement device for the assigned coordinates.

Thus, for the automatic adjustment of the sensing system corresponding to the magnification of the object image to be realized on the CCD matrix it is advantageous when an actuating element is provided at the objective and a driving element which is dimensioned as a function of the magnification to be realized is provided at the coordinate measurement device, wherein the objective and driving element can be brought into a working connection with one another for the purpose of setting magnification and can be adjusted by means of the drive of the coordinate measurement device. For the purpose of sharp focusing, the entire sensing system is implemented in a direction vertical to the object plane by means of the associated drive of the coordinate measurement device. For this purpose, in the case of a trunnion, the actuating element can be, e.g., a pin or, in the case of a rotating element, it can be a toothed wheel or friction wheel. The respective matching counterpiece at the coordinate measurement device is then, e.g., a fork-shaped trunnion receptacle or a toothed rack or friction rail. These individual parts can also be exchanged in a suitable manner.

Further, it is advantageous when additional operating controls can also be actuated via working connections between the actuating element and driving element by means of associated drives of the coordinate measurement device for carrying out additional switching functions. For example, these actuating elements can be rotary elements or disk elements, known per se, such as rotary switches or disk switches which can be coupled to suitable driving elements.

The sensing system further comprises a cross-line generator and a circuit arrangement for additive mixing of the cross-line signals generated in line generators with the signals of the CCD elements, wherein the time base for the formed cross-line signals is the readout clock of the CCD elements (pixels) of the CCD matrix.

Further, a logical circuit for linking the CCD elements displaying the vertical lines and horizontal lines is provided, wherein this circuit communicates on the output side with a first input of a flip-flop circuit. This flip-flop circuit is connected by its second input to an output of a comparator. The output of the comparator is connected, via a feedback resistor, with a second comparator input which also communicates with a threshold adjuster. A pulse logical element which supplies switching pulses for the coordinate measurement device is applied to the output of the flip-flop circuit.

A video transmitter is provided at the sensing system for wireless transmission of the sensing system signals to a video receiver of an evaluating device or display device and for displaying the measured values.

It is advantageous when the horizontal line and vertical line of the line generator are linked in such a way that a selective signal is generated by which the state of the comparator can be displayed as a function of the video signal in the flip-flop circuit, which selective signal can be used for adjusting or controlling the switching threshold of the comparator.

The switching signal generated by the edge detector can be conducted via the signal line of the sensing system of the coordinate measurement device. The edge detector itself is a point in the intersection region of the lines of the cross-line detector which blinks in time with the switching signal clock. It can be generated from a logic function of the lines.

By means of the compact construction of the optical sensing system with integration of the edge detector in the sensing system and the CNC-ready arrangement of the operating controls at the sensing system, the CNC-ready zoom objective and the LED illumination, a device has been provided which can be exchanged for a tactile sensing system in tactile operating coordinate measurement devices or which can be connected in parallel. This compactness is also achieved in that the operating controls and zoom adjustment are not provided with their own drives; rather, the existing drives of the coordinate measurement device are utilized for highly precise positioning. For this purpose, the coordinate measurement device positions the operating controls suitable for this purpose, e.g., the trunnion of the objective, relative to a receptacle which is fixed with respect to the frame, e.g., relative to the trunnion receptacle.

The compact construction also provides advantages with respect to the transmission of high frequencies.

The invention will be explained more fully hereinafter with reference to an embodiment example.

BRIEF DESCRIPTION OF THE DRAWINGS

In the drawings

FIG. 1 illustrates a basic construction shown in a highly simplified manner.

DESCRIPTION OF THE PREFERRED EMBODIMENTS

Figure 2:
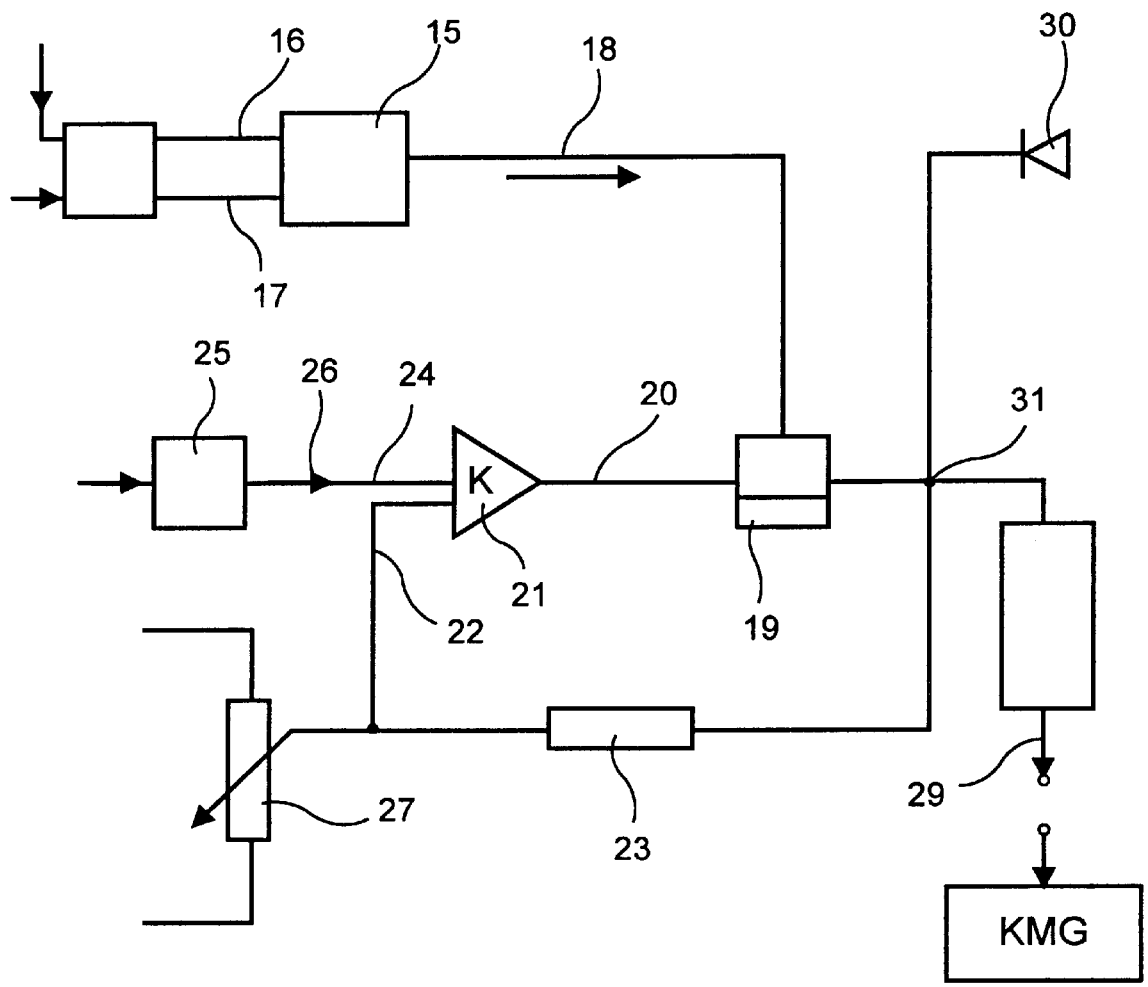
FIG. 2 is a block diagram illustrating the objectified determination of position.

The optical sensing system 1 shown in a simplified manner in FIG. 1 is arranged at the slide which is movable vertical to the stage 2 or at a pinhole of the coordinate measurement device which is movable in this direction and the sensing system 1 comprises an objective 3 which images the measurement object 4 arranged on the stage 2 on CCD elements of a CCD matrix 5 of a CCD camera. The sensing system 1 further comprises a unit containing a cross-line generator 6 and an edge detector 7. For wireless transmission of signals to a receiver of an evaluating device 9, a video transmitter 8 is likewise a component of the sensing system 1. This connection is carried out via the antennae 8.1 and 9.1 which are associated with the transmitter and the receiver. The evaluating device 9 can comprise a display unit 10 or such a display unit can be arranged subsequent to it.

The coordinate measurement device is electrically connected with the sensing system 1 by a signal line 11. The measurement object 4 can be illuminated by an illumination source 12 arranged at the end of the sensing system 1 facing the measurement object 4. An illumination source (not shown) is arranged below the stage 2 in the coordinate measurement device KMG for sub-stage or transmitted illumination of the measurement object 4.

An actuating element 13 is arranged at the objective 3, wherein the actuating element 13 can be brought into a working connection with a driving element 14 which is dimensioned depending on the magnification to be adjusted and is preferably fixedly arranged at the stage 2 of the coordinate measurement device. Depending on the magnification to be adjusted, the objective 3 is displaceable together with the CCD matrix connected with it in a direction extending vertical to the object plane for the purpose of focusing on the measurement object 4 by means of the corresponding drive of the coordinate measurement device associated with this direction or coordinate. The actuating element 13 can be constructed as a trunnion (FIG. 1) or also as a rotating element, e.g., as a lever. The driving element 14 is a fork-shaped trunnion receptacle (FIG. 1), for example, or a toothed rack or friction rail. In this case, these two structural component parts associated with one another must be easily connected with or disconnected from one another. Additional driving elements and actuating elements can also be provided for constructing additional switching functions which comprise rotary switches and/or disk switches, known per se.

Given CNC capability, a compactness of the optical sensing system 1 is achieved in that no independent drives are provided for the operating controls (actuating element 13 and driving element 14) or for the adjustment of magnification (zoom adjustment). These adjustments are carried out by the adjusting drives of the coordinate measurement device which serve for highly precise positioning of the stage 2, for example. This compactness has a further advantageous effect for the cross-line generation in the cross-line generator 6 and for the edge detector 7.

The objectified position determination of a structure or edge at the measurement object 4 is carried out by means of a circuit shown in FIG. 2. By means of the logic function arrangement 15, based on the pixel clock, a selective signal is generated at the output 18 of the logic function arrangement 15 from the horizontal line signals 16 and vertical line signals 17 generated by the cross-line generator 6, which output 18 is connected with one of the inputs of a flip-flop circuit 19 arranged subsequent thereto. By means of the selective signal at the output 18 of the logic function arrangement 15, the state of a comparator 21 is stored in the flip-flop circuit 19 as a function of the video signal 26 of a video receiver 25. This flip-flop circuit 19 is connected by a second input 20 with the output of the associated comparator 21, wherein the comparator 21 is connected by its one input 22, via a feedback resistor 23, with the output of the flip-flop circuit 19. The comparator 21 is connected by its second input 24 to the output of the video receiver 25.

This feedback resistor 23 provides for a stabilization of the switching behavior of the comparator 21 based on the noise proportions in the video signal. The switching threshold of the comparator 21 is changed by an adjusting resistor 27 which is connected with the input 22 of the comparator 21.

Every change in the signal edge at the output of the flip-flop circuit 19 generates in a subsequent pulse logical element 28 a switching pulse 29 for the coordinate measurement device, which switching pulse 29 is equivalent to a tactile sensing system. Further, the output 31 is displayed by means of a LED 30 because this signal simultaneously represents a light-dark signal for an instantaneous detector position with respect to a light-dark structure (intersection point of the lines of the cross-line) and serves as adjusting means for the threshold adjustment with the adjusting resistor 27.

While the foregoing description and drawings represent the present invention, it will be obvious to those skilled in the art that various changes may be made therein without departing from the true spirit and scope of the present invention.

What is claimed is:

1. A coordinate measurement device comprising:

an optical sensing system for non-contact sensing of edges or structures of measurement objects;

a CCD camera which images the edges or structures of the measurement object on a CCD matrix via an objective and in which the distance between the objective and CCD matrix can be changed for adjusting the magnification;

a displacing device for displacing the sensing system in at least one coordinate direction;

an actuating element arranged at the objective of the sensing system and a driving element provided at the coordinate measurement device outside of the sensing system, the actuating element and driving element being able to be brought into a working connection, so that when the working connection exists, the actuation of the displacing device leads to a change in the distance between the objective and CCD matrix, whereas when the working connection is canceled the actuation of the displacing device allows a focusing on the measurement object with the distance between the objective and matrix remaining the same;

cross-line generators and a circuit arrangement for additive mixing of the line signals generated electronically in the line generators with the signals of the CCD elements of the CCD matrix, wherein the time base for the cross-line signals is the readout clock of the CCD elements of the CCD matrix;

a logic function arrangement for linking the CCD elements representing the vertical lines and horizontal lines, wherein said logic function arrangement communicates on the output side with a first input of a flip-flop circuit which is connected by a second input to an output of a comparator and is connected by its output, via a feedback resistor, with a second input of the comparator which is simultaneously connected with the output for a position detection system; and a video transmitter for wireless transmission or wire-bound transmission of the sensing system signals to a video receiver of an evaluating and display unit.

2. The coordinate measurement device according to claim 1, wherein the adjustment of the objective and the CCD matrix connected therewith can be carried out in a direction vertical to the object plane by means of a drive of the coordinate measurement device, which drive is associated with this direction or coordinate.

3. The coordinate measurement device according to claim 2, wherein the actuating element is selected from a group consisting of a trunnion and a rotating element, and wherein the driving element is selected from a group consisting of a fork-shaped trunnion receptacle, a toothed rack and a friction rail.

4. The coordinate measurement device according to claim 1, wherein at least one of a cross-line generator and edge detector is included in the sensing system.

5. The coordinate measurement device according to claim 4, wherein the horizontal line and vertical line of the cross-line generator are linked in such a way that a selective signal is generated by which the state of the comparator can be displayed as a function of the video signal in the flip-flop circuit, which selective signal can be used for adjusting the switching threshold of the comparator and which is usable as a light-dark signal for determining direction and/or a sensing or scanning adjustment.

6. The coordinate measurement device according to claim 4, wherein the switching signal generated by one of the edge detector and by the cross-line generator is conducted via the signal line of the sensing system of the coordinate measurement device.

7. The coordinate measurement device according to claim 4, wherein the edge detector is a point in the intersection region of the lines of the cross-line detector which blinks in time with the switching signal clock and is generated from the logic function of the lines.

8. The coordinate measurement device according to claim 1, wherein additional operating controls can be actuated by working connections of the actuating element and driving element by means of associated drives of the coordinate measurement device for carrying out additional switching functions.

* * * * *